W. M. DECKER.
BABY CART.
APPLICATION FILED SEPT. 30, 1915.

1,208,109.

Patented Dec. 12, 1916.
2 SHEETS—SHEET 1.

INVENTOR
William M. Decker,
by Geyer & Popp
ATTORNEYS.

W. M. DECKER.
BABY CART.
APPLICATION FILED SEPT. 30, 1915.

1,208,109.

Patented Dec. 12, 1916.
2 SHEETS—SHEET 2.

INVENTOR
William M. Decker
by Geyer & Popp
ATTORNEYS.

UNITED STATES PATENT OFFICE.

WILLIAM M. DECKER, OF BUFFALO, NEW YORK.

BABY-CART.

1,208,109.  Specification of Letters Patent.  Patented Dec. 12, 1916.

Application filed September 30, 1915. Serial No. 53,262.

*To all whom it may concern:*

Be it known that I, WILLIAM M. DECKER, a citizen of the United States, residing at Buffalo, in the county of Erie and State of New York, have invented new and useful Improvements in Baby-Carts, of which the following is a specification.

This invention relates to improvements in baby carts of the class which are collapsible or foldable.

One object of the invention is to produce an inexpensive vehicle of this character which is not only strong and durable in construction, but at the same time light, neat in appearance and foldable into a small compass.

Another object is to so support or suspend the seat that its center of gravity and its load will be at a point ahead of the axle of the cart, thereby preventing the latter from tipping backward easily when at rest and rendering it safe in use.

A further object is to suspend the seat in such a manner that it will always hang vertically, regardless of the position of the frame of the cart.

Figure 1:
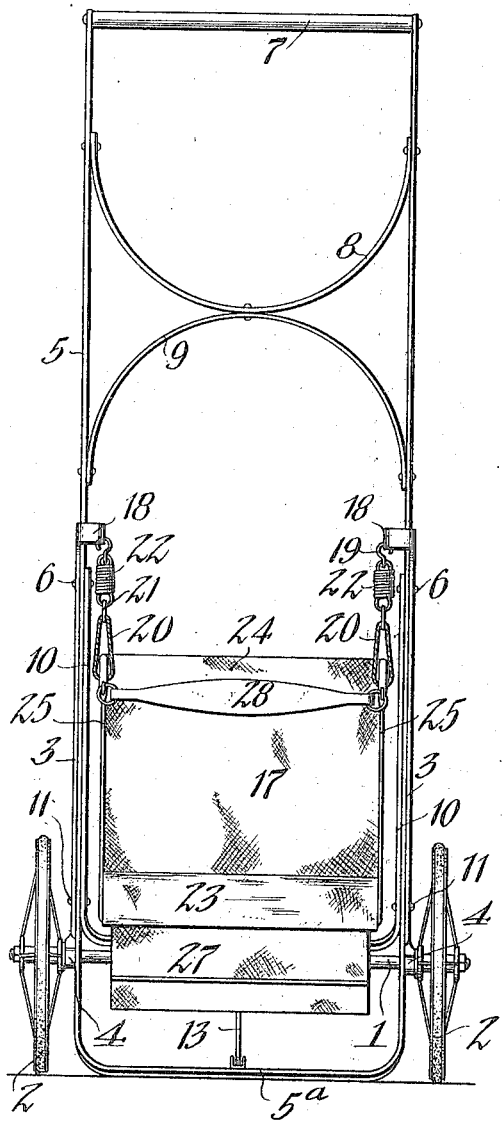
Figure 2:
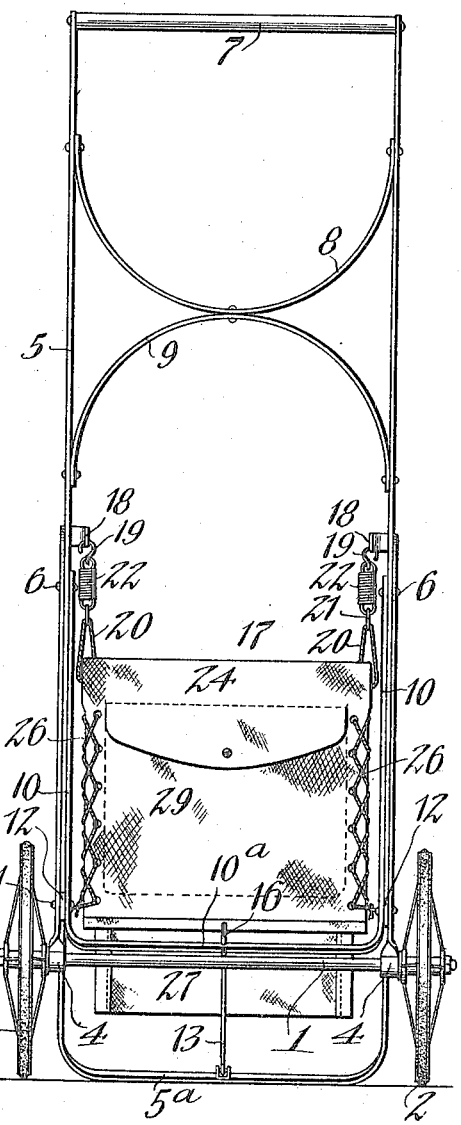
Figure 5:
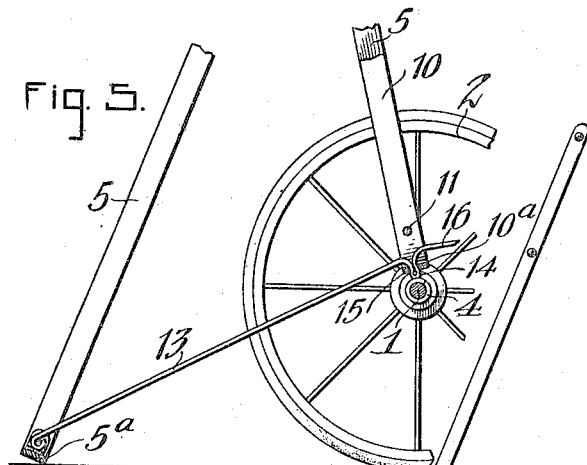
Figures 3, 4:
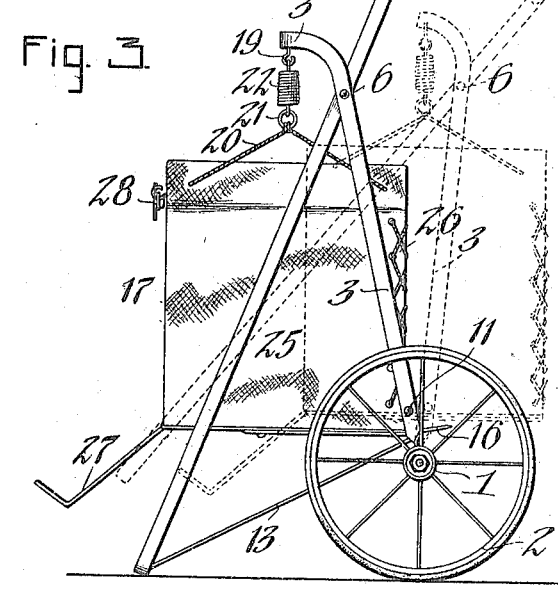

In the accompanying drawings: Figure 1 is a front elevation of the cart. Fig. 2 is a rear view of the same. Fig. 3 is a side elevation thereof, the dotted lines showing the frame tilted rearwardly in position to trundle the cart. Fig. 4 is a side view showing the cart folded. Fig. 5 is an enlarged vertical section of its lower portion, showing the locking brace in its normal position.

Similar characters of reference indicate corresponding parts throughout the several views.

1 indicates the axle of the cart having comparatively small wheels 2. Extending upwardly from the axle, on the inner sides of the wheels, are a pair of supporting arms 3 terminating at their lower ends in suitable bearings 4 which embrace the axle.

5 indicates a foldable forwardly-inclined frame constituting a combined handle-member and foot and having its side bars arranged on the inner sides of the supporting arms 3 and pivoted to the upper portions thereof by transverse pins or rivets 6, so that the frame may be folded in line with said arms, or nearly so, as shown in Fig. 4. These pivot-pins are located about midway between the ends of the frame. The latter is preferably U-shaped, as shown, and a suitable handle 7 is secured between its free upper ends for pushing the cart or carrying it conveniently when folded. For the purpose of reinforcing the upper portion of the handle frame, it may be provided with two semi-circular braces 8, 9 which are secured at their ends to the inner sides of the frame 1 and united at their contiguous convex backs by a rivet or other fastening.

The arms 3 are preferably stiffened by a U-shaped brace or reinforcement 10 arranged between them and having the upper ends of its side bars held in place by the pivots 6, while their lower portions are riveted or otherwise secured to the arms, as shown at 11. Spacing members 12 of suitable thickness are interposed between the arms and said reinforcement to allow the side bars of the frame 5 to pass freely between said parts when the cart is folded. Said frame 5 extends a suitable distance below the axle and its lower portion is arranged on the front side of the axle 1, so that when the frame is unfolded, as best shown by full lines in Fig. 3, it serves as a foot or strut which is adapted to rest on the ground when the cart is left standing and which limits the forward or tilting movement of the arms 3. The frame and said arms are normally locked in this unfolded position by any suitable means. The preferred device consists of a vertically-folding brace or rod 13 pivoted at its front end to the lower cross bar $5^a$ of the frame 5 and having its rear portion doubled to form a spring-loop or catch 14, which engages a slot or aperture 15 in the lower portion or cross bar $10^a$ of the brace 10. At its rear end this folding brace terminates in a finger piece 16 for releasing its catch when the cart is to be folded.

It will be understood from the foregoing that the arms 3 and the handle and foot member 5 together constitute the folding frame of the cart.

Suspended from the portions of the arms 3 above the pivots 6 and arranged between said arms and the side bars of the handle frame 5 is a suitable seat 17. In the preferred construction shown in the drawings, each of the supporting arms is curved upwardly and forwardly adjacent to the pivots 6, as shown at $3^a$, and then bent inwardly upon itself to form a support or bracket 18, from which brackets the seat is removably suspended by hooks 19 carried by the brackets, cords 20 attached to the sides of the seat and having rings 21, and springs 22 connecting said hooks and rings and serving to yieldingly support the seat, rendering it more comfortable to the infant. Any other appropriate suspension devices may however be employed, if desired. By thus curving the upper ends of the arms forwardly, as shown, the handle-frame can be compactly folded against the axle 1, without interfering with said brackets.

In its preferred construction, the seat comprises an upholstered bottom or board 23 having a back 24 and sides 25 of canvas or other flexible material extending a suitable distance above the bottom and capable of being folded inwardly and downwardly thereon, as shown in Fig. 4. The sides and back are laced at their corners, as shown at 26, to permit them to be disconnected and cleaned, when necessary. Secured to the underside of the seat is a foot rest 27 of any suitable construction, but preferably comprising a wire frame covered with the same material as the seat. Extending across the upper front portion of the seat is the customary retaining strap 28.

For convenience in carrying toilet articles and the like, a suitable pocket 29 is provided in the rear side of the seat-back.

As shown in Fig. 3, the point of suspension of the seat when the cart stands upright, is located a suitable distance ahead of the axle, in order to bring the center of gravity of the seat and its load on the front side of the axle, the unfolded frame-members of the cart being supported in this position by the foot of the handle frame 5. By this construction and arrangement, the seat tends to remain in its normal position forward of the axle and is not liable to be tipped backwardly in case it should be carelessly jostled while standing alone.

By suspending the seat as shown and described, it always assumes a vertical position, no matter what the angle of the handle-frame may be with respect to the ground. Furthermore, the seat is suspended at such an elevation that when the handle-frame is tilted back to trundle the cart, as shown by dotted lines in Fig. 3, the seat clears the cross bar of the reinforcement 10, and is free to swing through the space between the side bars of said frame. For this purpose, said cross bar is arranged immediately above the axle, as best shown in Fig. 2.

The several frame members may be constructed of any suitable material, such as aluminum, and may be flat-sided, round, half-round or of any other suitable cross section.

When it is desired to fold or collapse the cart, the finger-piece 16 of the folding brace is pulled upwardly to detach the brace from the reinforcement 10, after which the handle-frame 5 is swung toward the axle until it comes in contact with the cross bar 10ª of said reinforcement. During this folding movement, the locking brace 13 bears against said cross bar and is swung upwardly in line with the handle-frame, thus compactly folding the parts. After the frame members of the cart have been collapsed in this manner, the seat is folded in compact form by first pushing in its back and then folding its sides inwardly. While still suspended from the hooks 19, the seat is placed vertically between the arms 3 and the side bars of the handle piece and secured by the strap 28, as shown in Fig. 4, or by any other suitable means.

Aside from affording the advantages of safety, lightness and strength, this improved cart comprises but few parts and can therefore be manufactured at a reasonable cost.

I claim as my invention:

1. In a two-wheeled cart, the combination of an axle, a foldable frame carried by the axle and including a combined handle and foot-member, the lower or foot-portion of said member being arranged to stand on the ground when the cart is at rest and to clear the ground when the cart is trundled, and a seat suspended from said frame, the center of gravity of the seat and the frame being located in front of the axle when the cart is at rest.

2. In a folding cart, the combination of an axle having wheels, a foldable frame comprising a supporting member carried by the axle and extending upwardly therefrom, and a combined handle and foot member pivoted to said supporting member, means for holding said members in their unfolded position, and a seat suspended from said frame with its center of gravity located in front of the axle.

3. In a folding baby cart, the combination of an axle having wheels, supporting arms mounted on the axle, a folding handle frame pivoted to said supporting arms, a seat suspended from said arms, and means for holding said frame in its unfolded position, the lower portion of the frame being arranged on the front side of the axle and extending below the seat to form a foot.

4. In a folding baby cart, the combination of an axle having wheels, supporting arms extending upwardly from the axle, a folding handle-frame pivoted to said arms, a seat suspended from the upper portions of said arms, the point of suspension of the seat being on the front side of the axle, and means for holding said frame in its unfolded position.

5. In a folding baby cart, the combination of an axle having wheels, supporting arms extending upwardly from the axle, a folding handle-frame pivoted to said arms, the upper portions of the arms being curved forwardly beyond said frame and forming supports for a seat, and means for holding said handle-frame in its unfolded position.

6. In a folding baby cart, the combination of an axle having wheels, supporting arms extending upwardly from the axle, a folding handle frame pivoted to said arms, the upper portions of the arms being curved forwardly beyond said frame and bent inwardly upon themselves to form supports for a seat, and means for retaining said handle-frame in its unfolded position.

7. In a folding cart, the combination of an axle having wheels, a foldable frame comprising a supporting member carried by the axle and extending upwardly therefrom, and a combined handle and foot member pivoted to said supporting member, a seat suspended from said frame and a folding brace pivoted at one end to one of said frame-members and provided at its opposite end with means for detachably engaging the other frame-member.

8. In a baby cart, the combination of an axle having wheels, spaced supporting arms extending upwardly from the axle, a folding, forwardly-inclined handle-frame having side-bars pivoted between their ends to the upper portions of said arms, and a seat arranged between said arms and said side bars and suspended from the arms, the bottom of the seat being located above the level of the axle to clear the same in all positions of the handle-frame.

9. In a folding baby cart, the combination of an axle having wheels, supporting arms extending upwardly from the axle and carrying seat-supports, a brace connecting said arms, a handle-frame pivoted to said arms, and a locking bar pivoted at one end to said frame and provided at its other end with a catch arranged to engage said brace.

10. In a folding baby cart, the combination of an axle having wheels, supporting arms extending upwardly from the axle, a U-shaped reinforcement arranged between said arms and secured thereto, the cross bar of said reinforcement being located adjacent to the axle, a folding handle-frame pivoted to said arms, and a seat suspended from the upper portions of said arms and arranged to clear said cross bar in all positions of the handle-frame.

11. In a folding baby cart, the combination of an axle having wheels, supporting arms extending upwardly from the axle, suspension springs carried by said arms, a seat suspended from said springs, and a handle-frame pivoted to said arms.

WILLIAM M. DECKER.

Copies of this patent may be obtained for five cents each, by addressing the "Commissioner of Patents, Washington, D. C."